US009947294B2

(12) United States Patent
Douglas

(10) Patent No.: US 9,947,294 B2
(45) Date of Patent: Apr. 17, 2018

(54) POWER ADVANTAGED IMAGE DATA CONTROL

(71) Applicant: LENOVO (Singapore) PTE, LTD., New Tech Park (SG)

(72) Inventor: David W. Douglas, Cary, NC (US)

(73) Assignee: Lenovo (Singapore) PTE. LTD., New Tech Park (SG)

( * ) Notice: Subject to any disclaimer, the term of this patent is extended or adjusted under 35 U.S.C. 154(b) by 44 days.

(21) Appl. No.: 14/229,246

(22) Filed: Mar. 28, 2014

(65) Prior Publication Data

US 2015/0279322 A1 Oct. 1, 2015

(51) Int. Cl.
*G09G 3/3208* (2016.01)
*G09G 5/10* (2006.01)
*G06K 9/46* (2006.01)

(52) U.S. Cl.
CPC ............. *G09G 5/10* (2013.01); *G06K 9/4661* (2013.01); *G09G 3/3208* (2013.01); *G09G 2330/021* (2013.01); *G09G 2330/022* (2013.01)

(58) Field of Classification Search
CPC ....... G09G 3/3406; G09G 3/32; G06F 1/3265
See application file for complete search history.

(56) References Cited

U.S. PATENT DOCUMENTS

2004/0021658 A1* 2/2004 Chen ............................ 345/212
2004/0251970 A1* 12/2004 Fayneh ................ H03L 7/0893 331/16
2006/0222337 A1* 10/2006 Fujikawa .......... G06F 17/30843 386/241
2007/0002035 A1 1/2007 Plut
2007/0040820 A1* 2/2007 Lee ....................... G06F 1/3218 345/204
2009/0249095 A1* 10/2009 Poornachandran ... G06F 1/3203 713/320
2010/0174930 A1 7/2010 Kim et al.
2013/0135354 A1* 5/2013 Ookawara ..................... 345/660

FOREIGN PATENT DOCUMENTS

| | | | |
|---|---|---|---|
| CN | 1921670 | A | 2/2007 |
| CN | 101877745 | A | 11/2010 |
| EP | 1308921 | A2 | 5/2003 |
| EP | 2523431 | A1 | 11/2012 |
| GB | 2471175 | A | 12/2010 |

* cited by examiner

*Primary Examiner* — Alexander Eisen
*Assistant Examiner* — Cory Almeida
(74) *Attorney, Agent, or Firm* — Kunzler, PC

(57) ABSTRACT

For power-advantaged image data control, a method, system, and apparatus are disclosed. The method includes identifying, by use of a processor, a power source state, determining whether display data includes a power-adverse image based, at least in part, on the power source state, and replacing the power-adverse image with a power-advantaged image in response to the display data including the power-adverse image. In some embodiments, the method includes converting the power-adverse image into the power-advantaged image. In some embodiments, the method includes notifying a user, in response to displaying the power-advantaged image, that the power-advantaged image is displayed in place of the power-adverse image, and providing the user a control to display the power-adverse image in place of the power-advantaged image.

20 Claims, 6 Drawing Sheets

POWER ADVANTAGED IMAGE DATA CONTROL

FIELD

The subject matter disclosed herein relates to image data control for battery-powered displays and more particularly relates to power-advantaged image data control for battery-powered electroluminescent displays.

BACKGROUND

Description of the Related Art

Battery-powered displays are found on almost all mobile devices. In applications with predominantly white backgrounds, the power draw due to displaying the white is quite high for emissive displays, including light-emitting diode (LED) displays and organic light-emitting diode (OLED) displays. On dark image content, an OLED display consumes less power than an LCD of equal size. However, many software applications use white backgrounds, a worst case power consumption for an OLED display which negates the power advantages of an OLED display over LCD displays. Thus, OLED displays on mobile devices have a negative impact on battery life when bright (e.g., white) image content is predominantly displayed.

BRIEF SUMMARY

An apparatus for power-advantaged image data control is disclosed. A method and computer program product also perform the functions of the apparatus.

In certain embodiments, the apparatus includes a processor, a display operatively coupled to the processor, and a memory that stores code executable by the processor, the code including code that identifies a power source state, code that determines whether display data includes a power-intensive image based in part on the power source state, and code that displays an alternative image on the display in place of the power-intensive image in response to the display data including the power-intensive image.

In some embodiments, the apparatus includes code that converts the power-intensive image into the alternative image. In some embodiments, the apparatus includes performs a graphical function selected from the group consisting of: inverting the power-intensive image, reducing a brightness of the power-intensive image, and increasing a contrast of the power-intensive image. In some embodiments, the apparatus includes code that notifies a user that the alternative image is displayed in place of the power-intensive image.

In some embodiments, the apparatus includes code that adds an active application to a power-intensive application list in response to the active application including a power-intensive static image. In some embodiments, the apparatus includes a graphics processor unit that converts the power-intensive image into the alternative image. In some embodiments, the apparatus includes a timing controller that converts the power-intensive image into the alternative image. In some embodiments, the apparatus includes a power management microcontroller that inverts the power-intensive image to form the alternative image.

In some embodiments, the apparatus includes code that analyzes static image data derived from the display data and determines whether the display data includes a power-intensive image based on a distribution of the static image data.

In some embodiments, the apparatus includes code that identifies an active application and determines whether the display data includes a power-intensive image by comparing the active application to a power-intensive application list.

In certain embodiments, the method includes identifying, by use of a processor, a power source state, determining whether display data includes a power-adverse image based, at least in part, on the power source state, and replacing the power-adverse image with a power-advantaged image in response to the display data including the power-adverse image. In some embodiments, the method includes converting the power-adverse image into the power-advantaged image.

In some embodiments, the method includes converting the power-adverse image into the power-advantaged image includes performing a graphical function selected from the group consisting of: inverting the power-adverse image, reducing a brightness of the power-adverse image, and increasing a contrast of the power-adverse image. In some embodiments, the method includes notifying a user, in response to displaying the power-advantaged image, that the power-advantaged image is displayed in place of the power-adverse image, and providing the user a control to display the power-adverse image in place of the power-advantaged image.

In some embodiments, the method includes adding an active application to a power-adverse application list in response to the active application including a power-adverse static image. In some embodiments, the method includes analyzing static image data derived from the display data, and comparing a distribution of the static image data to a threshold to determine whether the display data includes a power-adverse image. In some embodiments, the method includes identifying an active application, and comparing the active application to a power-adverse application list.

In certain embodiments, the program product includes a computer readable storage medium that stores code executable by a processor to perform identifying a power source state, determining whether the display data includes a power-intensive image, replacing the power-adverse image with a power-advantaged image in the display data, responsive to the display data including the power-adverse image, and displaying the display data.

In some embodiments, the program product includes converting the power-adverse image into the power-advantaged image. In some embodiments, the program product includes notifying a user, in response to displaying the power-advantaged image, that the power-advantaged image is displayed in place of the power-adverse image, and providing the user a control to display the power-adverse image in place of the power-advantaged image.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
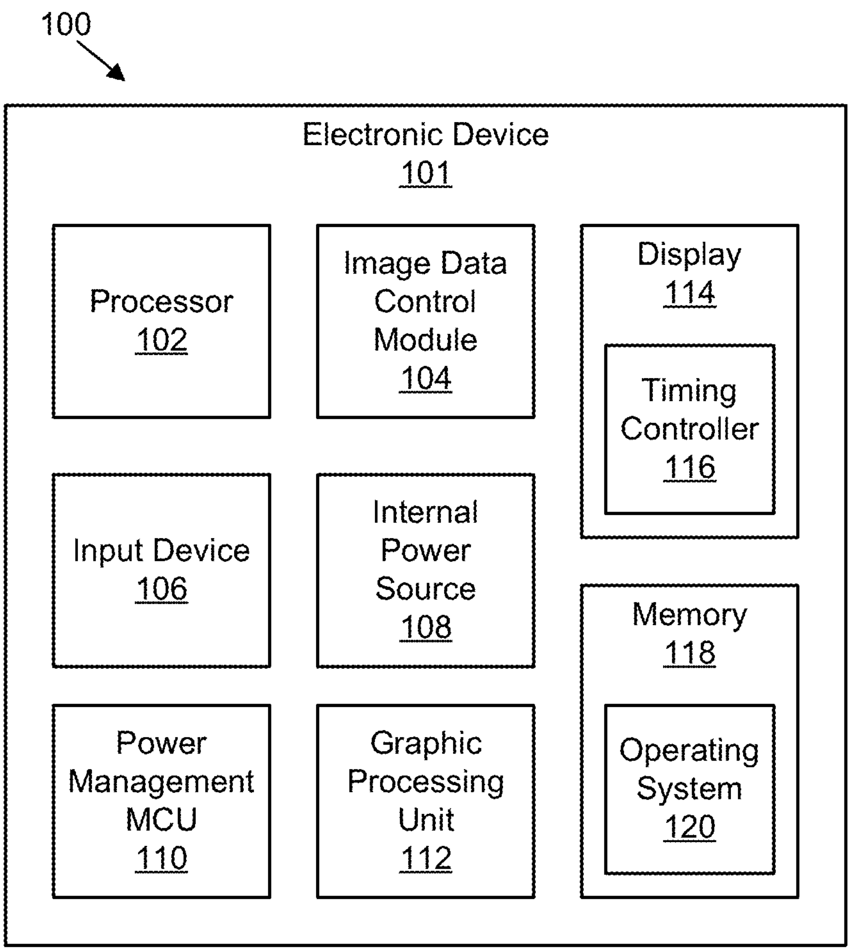
FIG. 1 is a schematic block diagram illustrating one embodiment of a system for power-advantaged image data control.

As will be appreciated by one skilled in the art, aspects of the embodiments may be embodied as a system, method or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, comprise one or more physical or logical blocks of executable code which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be written in any combination of one or more programming languages, including an object oriented programming language such as Java, Smalltalk, C++ or the like and conventional procedural programming languages, such as the "C" programming language or similar programming languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. These code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which comprises one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

This disclosure describes an image data control system that manipulates the image data being sent to the OLED display panel. When on battery power, the image data control system analyzes display data frame by frame to detect image content that is power-intensive (i.e., high duty). Power-intensive backgrounds, e.g., white backgrounds, are used heavily in typical applications. Examples of applications using power-intensive backgrounds include word processors, spreadsheet or slide-presentation programs, web browser, web pages, and the like. Image content detected as power-intensive triggers an image data transform that inverts, or switches, background and text color mapping. For example, when viewing word processors or web pages, backgrounds will change to black for low power consumption and the text will be change to a high contrast (e.g., white) color. By transforming the image data, the image data control system can reduce emissive display panel (e.g., organic light emitting diode (OLED) panels) power consumption by over 60% and enhance battery life of mobile devices.

FIG. 1 depicts a system 100 for power-advantaged image data control according to embodiments of the disclosure. In the embodiments of FIG. 1, the system 100 includes an electronic device 101. Examples of electronic devices include desktop, laptop, tablet, and handheld computers, mobile phones, smartphones, servers, and the like. As depicted the electronic device 101 includes a processor 102, an image data control module 104, an input device 106, an internal power source 108, a display 114, and a memory 118. In some embodiments, the electronic device 101 may also include one or more of a power management microcontroller (MCU) 110, a graphics processing unit (GPU) 112, a timing controller 116, and an operating system 120. Components of the electronic device 101 may be interconnected by a communication medium, such as a computer bus. Additionally, components of the electronic device 101 may be connected to and draw power from the internal power source 112.

The processor 102, in one embodiment, may comprise any known controller capable of executing computer-readable instructions and/or capable of performing logical operations on the input text. For example, the processor 102 may be a microcontroller, a microprocessor, a central processing unit (CPU), a graphics processing unit (GPU), an auxiliary processing unit, a FPGA, or similar programmable controller. The processor 102 may execute instructions stored in the memory 110 to perform the methods and routines described herein. In certain embodiments, the processor 102 includes an integrated graphics processor. In some embodiments, the processor 102 includes a processor cache that loads instructions and/or data from the memory 110 for execution by the processor 102.

The image data control module 104, in one embodiment, identifies the power state of the electronic device 101, determines whether data for display on the input device 106 includes a power-intensive image based on the power state of the electronic device 101, and replacing a portion of the display data corresponding to the power-intensive image with an alternative, power-friendly image in response to the display data including the power-intensive image. In some embodiments, the image data control module 104 displays the display data, including the power-friendly image.

In some embodiments, the image data control module 104 determines whether display data contains a power-adverse image by calculating an amount of power required to display an image. In some embodiments, determining 404 whether display data contains a power-adverse image includes analyzing the color distribution, brightness, or luminescence-per-area of the image to determine its power requirements. Image power requirements may be compared to one or more thresholds.

In some embodiments, the image data control module 104 replaces the power-intensive image with a pre-determined replacement image. In other embodiments, the image data control module 104 replacing the power-intensive image by dynamically converting of the power-adverse image into a power-friendly image. Converting the power-adverse image to a power-advantaged image may include inverting the power-intensive image, reducing a brightness of the power-intensive image, and increasing a contrast of the power-intensive image. Converting the image may also include swapping colors among dark text and light backgrounds.

In some embodiments, the image data control module 104 identifies images within display data. For example, identifying data corresponding to a particular image, such as a text block, a graph, video playback, and the like. In some embodiments, the image data control module 104 identifies borders and/or backgrounds associated with an application, such as menus and toolbars in a web browser or word processor. The image data control module 104 may determine if an image is static or dynamic. Static images may be tagged for further analysis while dynamic images may be ignored.

In certain embodiments, the image data control module 104 notifies the user that a power-advantaged image is being displayed in place of the power-adverse image. Notifying the user may include displaying a pop-up window or other visual alert informing the user that the alternative image is being displayed to minimize power consumption. The image data control module 104 may also allow the user to disregard the power-friendly color scheme and continue to display power-intensive images.

The input device 106, in one embodiment, may comprise any known computer input device. For example, the input device 106 may be a touch panel, a button, a key, or the like. In some embodiments, the input device 106 may be integrated with the display 114, such as a touchscreen or similar touch-sensitive display. In some embodiments, the image data control module 104 may be controlled via the input device 106. For example, a user may trigger (or stop) replacing a power-intensive image by the image data control module 104 via the input device 106.

The internal power source 108, in one embodiment, is a power storage device that provides electrical power to the electronic device 101. In some embodiments, the internal power source 108 is a battery or a capacitor. The internal power source 108, in some embodiments, may include a power port for receiving electrical power from an outside source, such as an AC power adapter, an external electrical generator, or an auxiliary battery. In some embodiments, the internal power source 108 is configured to identify the source of electrical power provided to the electronic device 101, for example from an internal battery or from an external AC power adapter.

The power management MCU 110, in one embodiment, may comprise any microcontroller unit capable of power management functions in the electronic device 101. The power management microcontroller 110 is configured to deliver electrical power to components of the electronic device 101. In some embodiments, the power management microcontroller 110 may be configured to reduce power consumption by switching inactive component to a low-power state. In some embodiments, the power management microcontroller 110 controls the brightness of the display 114. In some embodiments, the power management microcontroller 110 controls charging of the internal battery 108. In certain embodiments, the power management microcontroller 110 may be a part of a chipset that supports the processor 102. In other embodiments, the power management microcontroller 110 may be a component of the processor 102.

The power management microcontroller 110 may monitor the state of the internal power source 108. The power management microcontroller 110, in some embodiments, is configured to sense whether an AC power adapter is connected to the electronic device 101. In some embodiments, the power management microcontroller 110 may perform frame data analysis on the display data to identify power-intensive images, in response to the AC power adapter being disconnected. In certain embodiments, the power management microcontroller 110 may also convert the power-intensive images into power-friendly images and/or replace the power-intensive images with power-friendly images, in response to the AC power adapter being disconnected.

In certain embodiments, the power management microcontroller 110 may transmit an indication of the state of the internal power source 108. For example, the power management microcontroller 110 may send notifications to one or more of the image data control module 104, the graphic processing unit 112, the timing controller 116, and the operating system 120 when an AC power adapter is connected to or disconnected from the electronic device 101. In some embodiments, the image data control module 104 identifies the state by querying the power management microcontroller 110, by receiving a notification from the power management microcontroller 110, and/or by monitoring data maintained by the power management microcontroller 110.

The graphics processing unit 112, in one embodiment may comprise a specialized processing unit configured to process image data. In some embodiments, the graphic processing unit 112 creates image data for display on the display 114. For example, the graphic processing unit 112 may calculate brightness and color values for pixels in a frame of image data. In some embodiments, the graphic processing unit 112 is a component of the processor 102. In other embodiments, the graphic processing unit 112 is a separate component of the electronic device 101.

In some embodiments, the graphic processing unit 112 may perform frame data analysis on the display data to identify power-intensive images. In some embodiments, the graphic processing unit 112 is configured to convert power-intensive images into power-friendly images. For example, the graphic processing unit 112 may be configured to convert a window of dark text on a bright background into bright text on a dark background. The conversion may consist of a color swap between the text and the background or a color inversion of both the text and the background. As another example, the graphic processing unit 112 may replace bright image content with dark image content.

In certain embodiments, the graphic processing unit 112 determines whether an image is a static image (e.g., a background or border) and only analyzes static images for power intensity. For example, videos, animations, and other dynamic images may be ignored (i.e., no power analysis and/or image conversion performed), while text and background may be analyzed for power usage. In some embodiments, the image data control module 104 determining whether display data includes a power-intensive image by querying the graphic processing unit 112, by receiving a notification from the graphic processing unit 112, and/or by monitoring data maintained by the graphic processing unit 112.

In some embodiments, the graphic processing unit 112 may notify the user that an alternative, power-friendly color scheme, including replacement of power-intensive images, is available. The graphic processing unit 112 may, in some embodiments, allow the user to select a specific alternative color scheme. The graphic processing unit 112 may also allow the user to disregard the power-friendly color scheme and continue to display power-intensive images. The notification may be an opt-in notification that is presented prior to changing the color scheme (and replacing power-intensive images with power-friendly ones) or it may by an opt-out notification presented in response to changing the color scheme.

The display 114, in one embodiment, is operatively coupled to the processor 102 and may comprise an electronic display capable of outputting visual data to a user. In some embodiments, the display 114 comprises an active matrix electroluminescent display such as a light-emitting diode (LED) display, an organic light-emitting diode (OLED) display, or the like. In other embodiments, the display 114 may comprise an LED backlit liquid crystal display (LCD) capable of dynamic contrast via the LED backlight or localized dimming of the LED backlight.

In some embodiments, the display 114 includes a plurality of pixels. The pixels may be arranged in a matrix. In some embodiments, each pixel may be capable of displaying a particular combination of red, green, or blue (RGB) values corresponding to a portion of the display data. In some embodiments, the display data includes a visual frame, the visual frame including an RGB value for each pixels in the display 114.

In some embodiments, the display 114 may be integrated with the input device 106, such as a touchscreen or similar touch-sensitive display. In certain embodiments, the display 114 contains a timing controller 116. The display 114 may receive image data for display from the processor 102, the image data control module 104, power management microcontroller 110, the graphic processing unit 112, the timing controller 116 and/or the operating system 120.

The timing controller 116, in one embodiment, may comprise a microprocessor that processes image signals and translates RGB data into control signals that control the display elements (e.g., OLED pixels) of the display 114. The timing controller 116 typically performs motion estimation, motion compensation, frame rate conversion, and/or dynamic backlight control. In some embodiments, the timing controller 116 may perform frame data analysis on the display data to identify power-intensive images. The timing controller 116 may also convert the power-intensive images into power-friendly images and/or replace the power-intensive images with power-friendly images.

The memory 118, in one embodiment, is the primary memory of the electronic device 101 and may comprise any known computer readable storage medium. The main memory 118 is directly accessible by the processor 102 and may include the operating system 120 as well as program code and/or data for one or more applications actively running on the electronic device 101. In some embodiments, program code stored in the memory 118 is used to implement the methods and routines described herein. In some embodiments, the memory 118 contains image data to be displayed on the display 114 and generated by the operating system 120 and/or other applications.

The operating system 120, in one embodiment, is a collection of program code that manages hardware resources of the electronic device 101 and provides services to programs running on the electronic device 101, such as one or more applications. Services provides by the operating system 120 include process management, memory management, file system, device drives, and input/output (I/O).

In some embodiments, the operating system 120 is configured to identify a power state of the electronic device 101 and/or of the internal power source 108. In certain embodiments, the operating system 120 may receive an indication of the power state of the electronic device 101 and/or the internal power source 108, for example when an AC power adapter is connected to or disconnected from the electronic device 101. In some embodiments, the operating system 120 is configured to inform other processes, devices, or module of the power state of the electronic device 101 and/or of the internal power source 108. For example, the operating system 120 may inform one or more of the image data control module 104, graphic processing unit 112, and the timing controller 116 of the power state of the electronic device 101.

In some embodiments, the operating system 120 is configured to perform frame data analysis on the display data to determine whether display data includes power-intensive images. For example, the operating system 120 may identify images within the display data and/or determine a power requirement of the images. In some embodiments, the operating system 120 may also convert the power-intensive images into power-friendly images and/or replace the power-intensive images with alternative images, the alternative images consuming less power to display than the power-intensive images.

In some embodiments, the operating system 120 adjusts a color scheme used by a graphical user interface (GUI) in response to an AC power adapter being disconnected from the electronic device 101. The operating system 120 may also convert power-intensive images into power-friendly images and/or replace the power-intensive images with power-friendly images, in response to the AC power adapter being disconnected. The operating system 120 may automatically disable the image data control module 104 when an AC power adapter is connected to the electronic device 101. In some embodiments, the operating system 120 is configured to automatically disable the image data control module 104 when video is being played, for example during DVD playback or video streaming.

In some embodiments, the operating system 120 provides user controls to for enabling and/or disabling the image data control module 104. The operating system 120 may also provide a notification to the user whenever the image data control module 104 is enabled (i.e., when the image data control module 104 is replacing power-intensive images with power-friendly images). In some embodiments, the user controls also allow user to select specific alternative color scheme.

Figure 2:
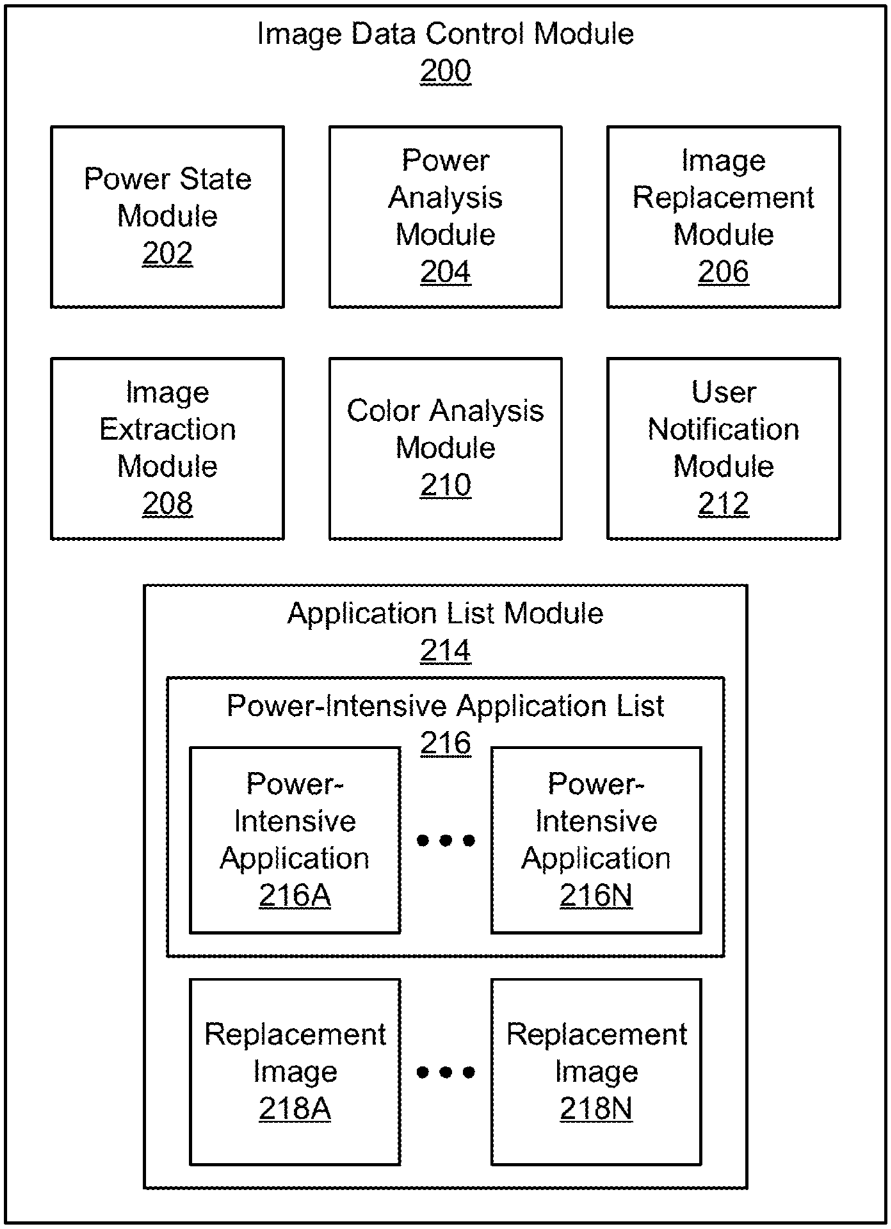
FIG. 2 is a schematic block diagram illustrating one embodiment of an apparatus for power-advantaged image data control.

FIG. 2 depicts an image data control module 200. The image control data module 200 may comprise an image data control module 104, as described above with reference to FIG. 1. The image control data module 200 includes a power state module 202, a power analysis module 204, and an image replacement module 206. In some embodiments, the image control data module 200 may also include one or more of an image extraction module 208, a color analysis module 210, a user notification module 212, and an application list module 214. Components of the image control data module 200 may be communicatively coupled to each other and may pass information to one another.

The power state module 202, in one embodiment, is configured to identify the power state of the electronic device 101 and/or the internal power source 108. In some embodiments, the power state module 202 determines whether the electronic device 101 is relying solely on the internal power source 108 for power. Possible power states of the electronic device 101 include "on battery", "battery charging", "on AC power", and the like. In some embodiments, the power state module 202 is configured to query the internal power source 108, power management microcontroller 110, and/or the operating system 120 to identify a current power state of the electronic device 101. In some embodiments, the power state module 202 receives notifications from the processor 102, internal power source 108, power management microcontroller 110, and/or the operating system 120 that indicate a current power state of the electronic device 101 and/or the internal power source 108.

The power analysis module 204, in one embodiment, is configured to determine an amount of power required to display an image. The power analysis module 204 is further configured to determine whether an image is power-intensive (i.e., requiring a large amount of power to display) by comparing the image power requirements to one or more thresholds. In some embodiments, the power analysis module 204 may tag or flag power-intensive images, thereby marking them for conversion and/or replacement.

In some embodiments, the power analysis module 204 operates based, at least in part, on the power state of the electronic device 101 and/or the internal power source 108. For example, if the power state of the electronic device 101 is "on AC power" and/or the state of the internal power source 108 is "charging", then the power analysis module 204 may ignore the power requirements of images because the electronic device 101 is not relying solely on the internal power source 108 for electrical power. On the other hand, if the power state of the electronic device 101 is "on battery power", then the power analysis module 204 may tag or flag power-intensive images.

The power analysis module 204 may analyze a variety of factors to determine an amount of power required to display an image. In some embodiments, the power analysis module 204 analyzes the color distribution of the image to determine its power requirements. For example, if the color distribution exceeds one or more thresholds, the power analysis module 204 may tag the image as power-intensive. In some embodiments, the power analysis module 204 analyzes the brightness or luminescence per area of the image to determine its power requirements. For example, if the overall brightness of a particular image is above a threshold, the power analysis module 204 may tag the image as power-intensive. The brightness may be determined from RGB values, spectral power distribution, required OLED duty cycle and/or current draw, or the like. In some embodiments, the power analysis module 204 also determines whether the image is a static image (e.g., text, graphics, backgrounds, and the like) and only analyzes and/or tags the image in response to the image being static.

The image replacement module 206, in one embodiment, is configured to display an alternative, power-friendly image on the display in place of the power-intensive image in response to the display data including the power-intensive image. The image replacement module 206 replaces the portion of the display data corresponding to the power-intensive image with display data for the power-friendly image. In some embodiments, the image replacement module 206 replaces the power-intensive image with a predetermined replacement image. In other embodiments, the image replacement module 206 replaces the power-intensive image with a dynamic conversion of the power-intensive image.

In certain embodiments, the image replacement module 206 is configured to convert a power-intensive image into an alternative, power-friendly image. Image conversion may include inverting the power-intensive image, reducing a brightness of the power-intensive image, and increasing a contrast of the power-intensive image. Image conversion may also include swapping colors among dark text and light backgrounds. In other embodiments, the image conversion may be performed by one or more of the power management microcontroller 110, graphic processing unit 112, timing controller 116, and the operating system 120. For example, the image replacement module 206 may instruct a hardware device, e.g., the graphic processing unit 112, to convert the power-intensive image into the alternative, power-friendly image.

In some embodiments, the image replacement module 206 only operates on images tagged as power-intensive by the power analysis module 204 and/or the color analysis module 210. For example, the image replacement module 206 may receive an indication from the power analysis module 204 and/or color analysis module 210 that a particular image is a power-intensive image and should be replaced with an alternative, power-friendly image.

The image extraction module 208, in one embodiment, is configured to identify images among the display data. The image extraction module 208 processes the display data to identify data corresponding to a particular image, such as a text block, a graph, video playback, and the like. In certain embodiments, the image extraction module 208 may be a component of the power analysis module 204. In other embodiments, the image extraction module 208 is separate from the power analysis module 204 and identifies images for examination by the power analysis module 204.

In some embodiments, the image extraction module 208 tags the identified images for analysis by the power analysis module 204 and/or the color analysis module 210. For example, the image extraction module 208 may identify a portion of the display data corresponding to a text block and tag the display data portion for further analysis. As another example, the image extraction module 208 may identify a window and/or elements within the window from the display data. The image extraction module 208 ensures that a contiguous image is analyzed by the power analysis module 204 and/or the color analysis module 210 to avoid piecemeal analysis of a single image. The image extraction module 208 prevents graphical anomalies and incongruities, such as one line of a text block being inverted while the rest remain in the original state.

The image extraction module 208 may identify image boundaries, e.g., boundaries of a graph or illustration. In some embodiments, the image extraction module 208 also identifies text and corresponding backgrounds (i.e., a text block) as a single image, thereby ensuring that the entire text block remains readable. In some embodiments, the image extraction module 208 identifies borders and/or background associated with an application, such as menus and toolbars in a web browser or word processor.

In certain embodiments, the image extraction module 208 may determine if an image is static or dynamic. A static image is one that remains constant from frame-to-frame, while a dynamic image varies from one frame to another. Examples of static images include, but are not limited to, backgrounds, borders, illustrations, graphs, text, icons, and the like. Examples of dynamic images include, but are not limited to, video playback, animations, and the like. The image extraction module 208 may tag the static images for further analysis and ignore the dynamic images. In certain embodiments, the image extraction module 208 tags moving text not a part of a video. For example, text in a ticker banner would be tagged while subtitles in a movie would not be tagged.

The color analysis module 210, in one embodiment, is configured to analyze image data derived from the display data to determine the distribution of colors in an image. In certain embodiments, the color analysis module 210 may be a component of the power analysis module 204. In other embodiments, the color analysis module 210 is separate from the power analysis module 204 and analyzes image color distribution for the power analysis module 204. The color analysis module 210 may identify static images within the display data or may operate on images tagged by the image extraction module 208. The static images may include text, graphics, illustrations, backgrounds, borders, and the like. The color analysis module 210 may ignore dynamic images, such as video.

The color analysis module 210 may use the color distribution to compute power draw of the images. In some embodiments, the color analysis module 210 determines spectral power distribution of the images. In certain embodiments, the spectral power distribution identifies power per unit wavelength for the image. In certain embodiments, the spectral power distribution identifies power per area per OLED sub-pixel (e.g., a RGB sub-pixel). The color analysis module 210 may compare color distribution and/or the spectral power distribution to one or more thresholds to determine if an image is a power-intensive. For example, if two RGB components for an image exceed a threshold, the image may be flagged as power-intensive.

In some embodiments, the color analysis module 210 may create histogram of each frame of display data to detect content that is power-intensive. The histogram may be compared to a threshold or profile to identify image content as power intensive. Image content that exceed the threshold or profile may be flagged as power-intensive.

The user notification module 212, in one embodiment, is configured to notify the user that the alternative image is displayed in place of the power-intensive image. For example, the user notification module 212 may display a pop-up window or other visual alert notifying the user that the alternative image is being displayed to minimize power consumption. In some embodiments, the user notification module 212 may notify the user that an alternative, power-friendly color scheme is being applied to minimize power consumption. The user notification module 212 may, in some embodiments, allow the user to select a specific alternative color scheme.

In some embodiments, the user notification module 212 provides an opt-out notification in response to the image replacement module 206 replaces the power-intensive image. In other embodiments, the user notification module 212 provides an opt-in notification in response to an AC power adapter being disconnected from the user notification module 212. The opt-in notification may alert the user of the power savings available through the image control data module 200 and prompt the user to proceed with color changes that will extend the battery life of the electronic device 101.

In certain embodiments, the user notification module 212 also provides the users with one or more controls that undo the image replacement and/or color scheme change (i.e., disabling the image data control module 104 and/or image replacement module 206). The one or more controls may be accompanied by a warning that battery life will decrease if power-intensive images are displayed. In some embodiments, the user notification module 212 estimates a power saving (e.g., a battery life increase) of the electronic device 101 due to using power-friendly color schemes and images. The power savings may be expresses as a percentage (e.g., 40%) or a time remaining (e.g., an extra 150 minutes).

The application list module 214, in one embodiment, is configured to compile and store a list 216 of applications that use static, power-intensive images. If an active application is determined to use a static, power-intensive image, the application list module 214 adds the active application to the application list 216. The application list 216 includes a plurality of entries 216A-216N, each entry corresponding to an application that uses static, power-intensive images. In some embodiments, each entry in the application list 216 includes an identifier that uniquely identifies a power-intensive application (i.e., an application that uses one or more static, power-intensive images).

In some embodiments, the application list module 214 also stores replacement images 218A-218N, or pointers to replacement images, corresponding to power-intensive applications 216A-216N in the application list 216. The application list module 214 may store (or cause to be stored) a replacement image used by the image replacement module 206 to replace a power-intensive image. In some embodiments, there is a one-to-one correspondence of applications and images in the application list module 214. In other embodiments, a plurality of the replacement images 218A-218N may be associated with a single application (e.g., power-intensive application 216A) stored in the application list. In yet other embodiments, a pointer to a replacement image may be stored with the application identifier in an entry of the application list 216.

The application list module 214 may receive an indication from the power analysis module 204 and/or color analysis module 210 that an image is a power-intensive image. If the power-intensive image is a static image and if the application using the power-intensive image is known, the application list module 214 may the application to the application list 216. In some embodiments, the power analysis module 204 and/or the color analysis module 210 may determine whether an image is power-intensive, in part, by comparing an application using the image to the power-intensive application list 216. In some embodiments, each entry 216A-216N identifies one or more power-intensive images in the application and locations for each image (e.g., relative to other elements in an application's graphical interface).

Figure 3A:
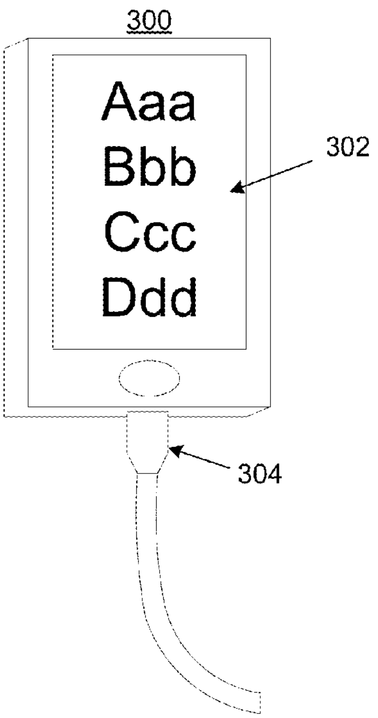
FIG. 3A is a diagram illustrating one embodiment of an electronic device performing power-advantaged image data control.

FIG. 3A-3D depict an electronic device 300 performing power-advantaged image data control. FIG. 3A depicts the electronic device 300 displaying an image 302 while connected to an AC power adapter 304. The image 302 is power-adverse, having dark text and a light background. FIG. 3A shows the electronic device 300 with the power-advantaged image control disabled due to the connection to the AC power adapter 304. In some embodiments, the device 300 analyzes the image 302 to determine that it is power-adverse while the electronic device 300 is connected to the AC power adapter 304. In other embodiments, the electronic device 300 ignores the power requirements of the image 302 while connected to the AC power adapter 304. Regardless, the electronic device 300 displays the power adverse image 302 while connected to the AC power adapter 304.

Figure 3B:
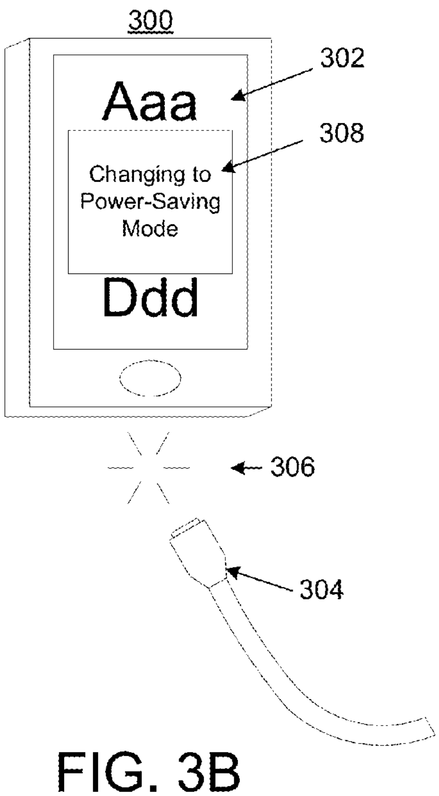
FIG. 3B is another diagram illustrating the electronic device of FIG. 3A.

FIG. 3B depicts the electronic device 300 when the AC power adapter 304 is disconnected 306. At this point the electronic device 300 relies solely on its internal battery for electrical power and it begin to perform power-advantaged image control. In some embodiments, the electronic device 300 has already determined that the image 302 is power-adverse. In other embodiments, the electronic device 300 analyzes the image 302 when the AC power adapter 304 is disconnected 306 and determines that the image 302 is power-adverse. The electronic device 300 displays a notification 308 to the user informing that the electronic device 300 is changing to a power-advantaged image control mode (i.e., a power-saving mode). In the power-advantaged image control mode, the electronic device 300 analyzes images in the display data, identifies power-adverse images, and replaces the power-adverse images with power-advantaged images.

Figure 3C:
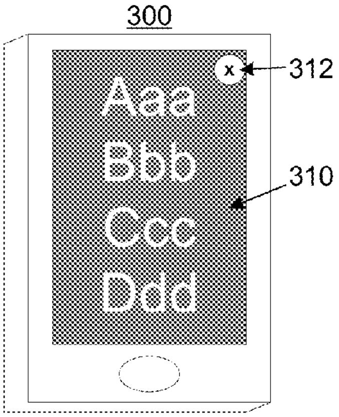
FIG. 3C is another diagram illustrating the electronic device of FIG. 3A.

FIG. 3C depicts the electronic device 300 after entering the power-advantaged image control mode. The electronic device 300 has converted the image 302 into the power-advantaged image 310. As depicted, the power-advantaged image 310 consists of light text on a dark background. The power-advantaged image 310 requires less power to display than the image 302 and extends the battery life of the electronic device 300. In certain embodiments, the electronic device 300 also displays an opt-out control 312 allowing the user to display the power-adverse image 302 instead of the power-advantaged image 310 despite the additional power draw of the image 302. Should the user select the opt-out control 312, the electronic device 300 will exit the power-advantaged image control mode.

Figure 3D:
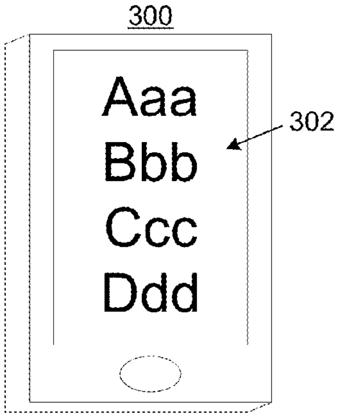
FIG. 3D is another diagram illustrating the electronic device of FIG. 3A.

FIG. 3D depicts the electronic device 300 after the user has selected the opt-out control 312. The electronic device 300 has exited the power-advantaged image control mode and no longer displays the power-advantaged image 310. Instead the electronic device 300 reverts to displaying the image 302 despite the additional power draw and despite being disconnected from the AC power adapter 304.

Figure 4:
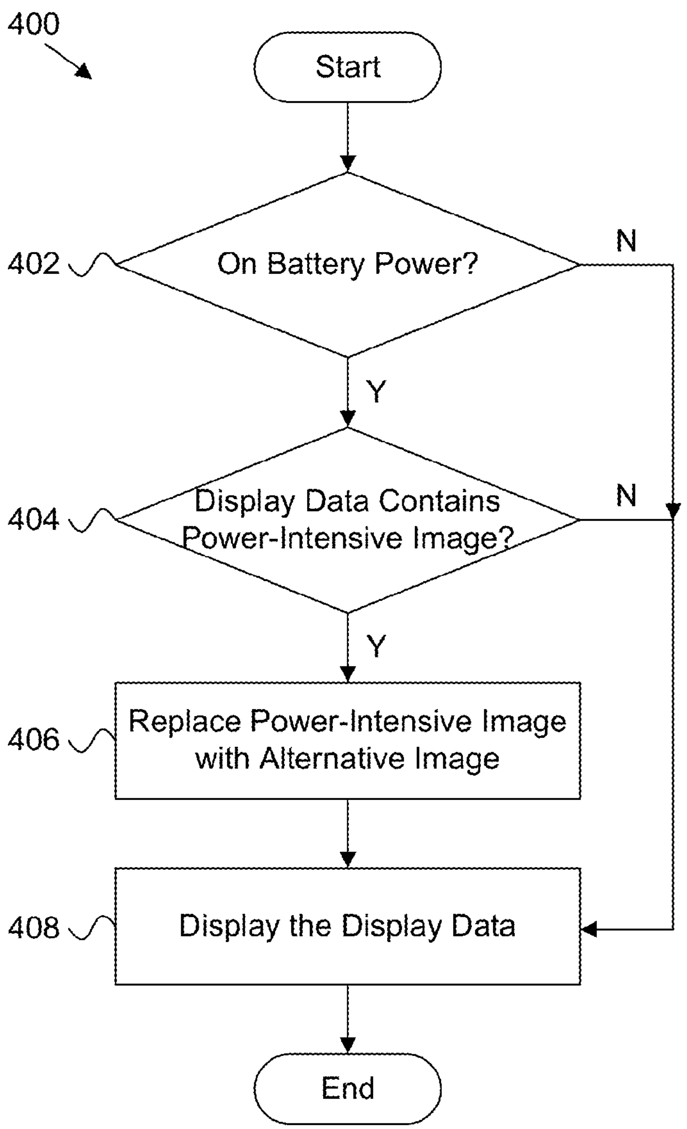
FIG. 4 is a schematic flow chart diagram illustrating one embodiment of a method for power-advantaged image data control.

FIG. 4 depicts a method 400 for power-advantaged image data control according to embodiments of the disclosure. The method 400 begins with determining 402 whether an electronic device, such as the electronic device 101, is running on battery power. In some embodiments, this power state is determined 402 by consulting an internal battery (e.g., the internal power source 108), a power management function (e.g., the power management microcontroller 110), an operating system (e.g., the operating system 120), or the like. In some embodiments, the electronic device 101 is determined to not be running on battery power when an AC adapter, external battery, or external electrical generator (e.g., solar panel) is connected to the electronic device. Determining 402 whether the electronic device is running on battery power may be performed by one or more of the processor 102, the image data control module 104, the internal power source 108, the power management microcontroller 110, the operating system 120, and the power state module 202.

If it is determined that the electronic device is running on battery power, then the electronic device determines 404 whether display data includes a power-adverse image. Otherwise, if it is determined that the electronic device is not running on battery power, then the electronic device displays 408 the display data.

In some embodiments, determining 404 whether display data contains a power-adverse image includes calculating an amount of power required to display an image. Image power requirements may be compared to one or more thresholds. In some embodiments, determining 404 whether display data contains a power-adverse image includes analyzing the color distribution, brightness, or luminescence-per-area of the image to determine its power requirements. In some embodiments, determining 404 whether display data contains a power-adverse image includes identifying an active application and comparing the active application to a power-adverse application list, the power-adverse application list containing applications known to use static, power-adverse images. Determining 404 whether display data contains a power-adverse image may be performed by one or more of the image data control module 104, the power management microcontroller 110, the graphic processing unit 112, the timing controller 116, the operating system 120, the power analysis module 204, and the color analysis module 210.

If it is determined 404 that the display data contains a power-adverse image, then the electronic device replaces 406 the power-adverse image with an alternative, power-advantaged image. Otherwise, if it is determined 404 that the display data does not contain a power-adverse image, then the electronic device displays 408 the display data.

In some embodiments, replacing 406 the power-adverse image with the power-advantaged image includes replacing a portion of the display data corresponding to the power-adverse image with display data corresponding to the power-advantaged image. In some embodiments, the replacing 406 the power-adverse image with the alternative image includes retrieving a pre-determined replacement image. In other embodiments, the replacing 406 the power-adverse image with the alternative image includes dynamically converting of the power-adverse image to obtain a power-advantaged image. Replacing 406 the power-adverse image with the alternative image may be performed by one or more of the image data control module 104, power management microcontroller 110, graphic processing unit 112, timing controller 116, operating system 120, and the image replacement module 206.

Displaying 408 the display data includes controlling a display device, such as an OLED display panel to present text, graphics, video, and the like included in the display data. The method 400 ends.

Figure 5:
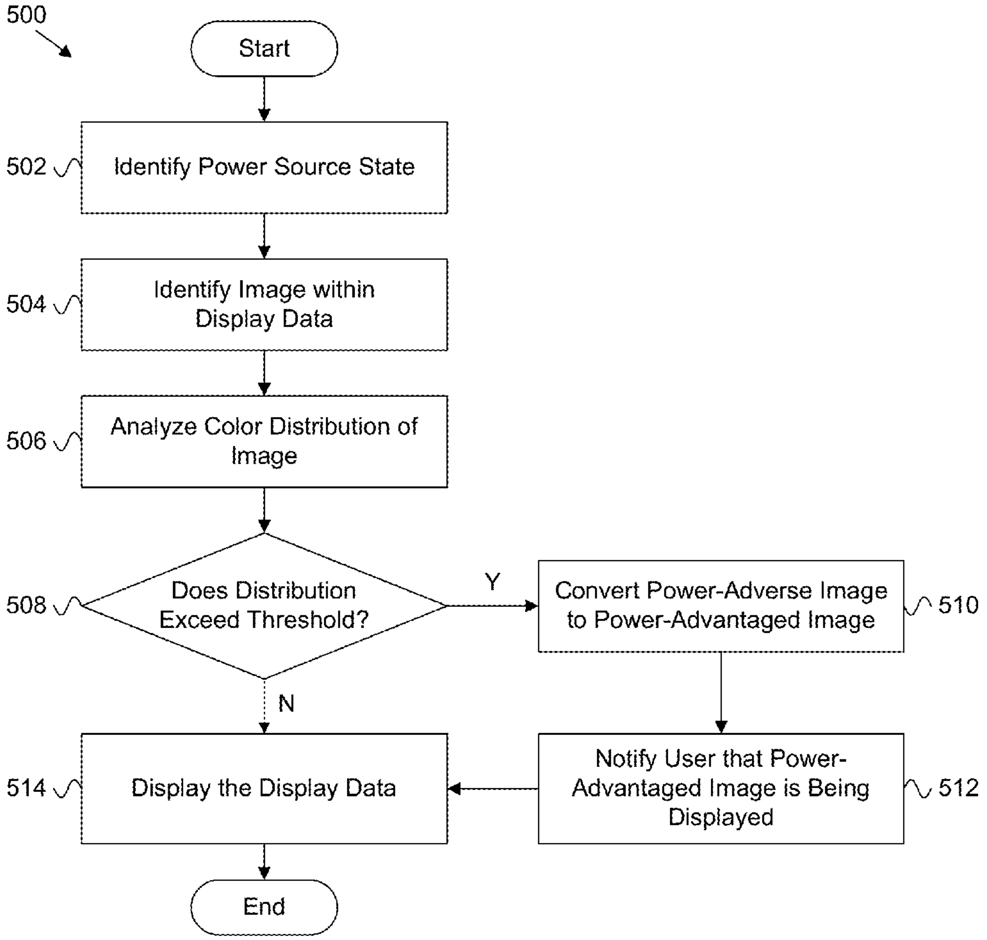
FIG. 5 is a schematic flow chart diagram illustrating another embodiment of a method for power-advantaged image data control.

FIG. 5 depicts a method 500 for power-advantaged image data control according to embodiments of the disclosure. The method 500 begins with determining 502 whether an electronic device, such as the electronic device 101, is running on battery power. In some embodiments, this power state is determined 502 by consulting an internal battery (e.g., the internal power source 108), a power management function (e.g., the power management microcontroller 110), an operating system (e.g., the operating system 120), or the like. In some embodiments, the electronic device 101 is determined to not be running on battery power when an AC adapter, external battery, or external electrical generator (e.g., solar panel) is connected to the electronic device. Determining 502 whether the electronic device is running on battery power may be performed by one or more of the processor 102, the image data control module 104, the internal power source 108, the power management microcontroller 110, the operating system 120, and the power state module 202.

Next, the electronic device identifies 504 an image within display data. Identifying 504 an image may include parsing the display data to identify data corresponding to a particular image, such as a text block, a graph, video playback, and the like. In some embodiments, identifying 504 an image includes identifying image boundaries, such as the boundaries of a graph or illustration. In some embodiments, identifying 504 an image includes identifying a text block i.e., text and corresponding backgrounds. In some embodiments, identifying 504 an image includes identifying borders and/or background associated with an application, such as menus and toolbars in a web browser or word processor.

In certain embodiments, identifying 504 an image may include determining if an image is static or dynamic. Static images may be tagged for further analysis while dynamic images may be ignored. In some embodiments, identifying 504 an image includes tagging identified images for further analysis. Identifying 504 an image may be performed by one or more of the image data control module 104, the power management microcontroller 110, the graphic processing unit 112, the timing controller 116, the operating system 120, the power analysis module 204, and the image extraction module 208.

The electronic device next analyzes 506 the distribution of colors in the identified images. Analyzing 506 the color distribution may include determining spectral power distribution of the identified images. In certain embodiments, the spectral power distribution identifies power per unit wavelength for the image. In certain embodiments, the spectral power distribution identifies power per area per OLED sub-pixel (e.g., a RGB sub-pixel). In some embodiments, analyzing 506 the color distribution includes creating a histogram of each frame of display data. Analyzing 506 the color distribution may be performed by one or more of the image data control module 104, the graphic processing unit 112, the timing controller 116, the operating system 120, the power analysis module 204, and the image extraction module 208.

The electronic device then determines 508 whether the color distribution exceeds a threshold. In some embodiments, the threshold is predefined. The threshold may be based on user preference, battery life, or the like. Determining 508 whether the distribution exceeds a threshold may be performed by one or more of the image data control module 104, the graphic processing unit 112, the timing controller 116, the operating system 120, the power analysis module 204, and the image extraction module 208.

If it is determined 508 that the color distribution of an image exceeds a threshold, then the electronic device converts 510 the image to a power-advantaged image. Otherwise, the electronic device displays 514 the display data.

Converting 510 the power-adverse image to a power-advantaged image includes inverting the power-intensive image, reducing a brightness of the power-intensive image, and increasing a contrast of the power-intensive image. Converting 510 the image may also include swapping colors among dark text and light backgrounds. Converting 510 the power-adverse image may be performed by one or more of the power management microcontroller 110, graphic processing unit 112, timing controller 116, the operating system 120, and the image replacement module 206.

The electronic device next notifies 512 the user that a power-advantaged image is being displayed in place of the power-adverse image. Notifying 512 the user may include displaying a pop-up window or other visual alert informing the user that the alternative image is being displayed to minimize power consumption. In some embodiments, notifying 512 the user includes informing the user that an alternative, power-friendly color scheme, including replacement of power-intensive images, is available. The electronic device may, in some embodiments, allow the user to select a specific alternative color scheme. The electronic device may also allow the user to disregard the power-friendly color scheme and continue to display power-intensive images. Notifying 512 the user may be performed by one or more of the image data control module 104, graphic processing unit 112, operating system 120, and the user notification module 212. The display data is then displayed 514.

Displaying 514 the display data includes controlling a display device, such as an OLED display panel to present text, graphics, video, and the like included in the display data. The method 500 ends.

Figure 6:
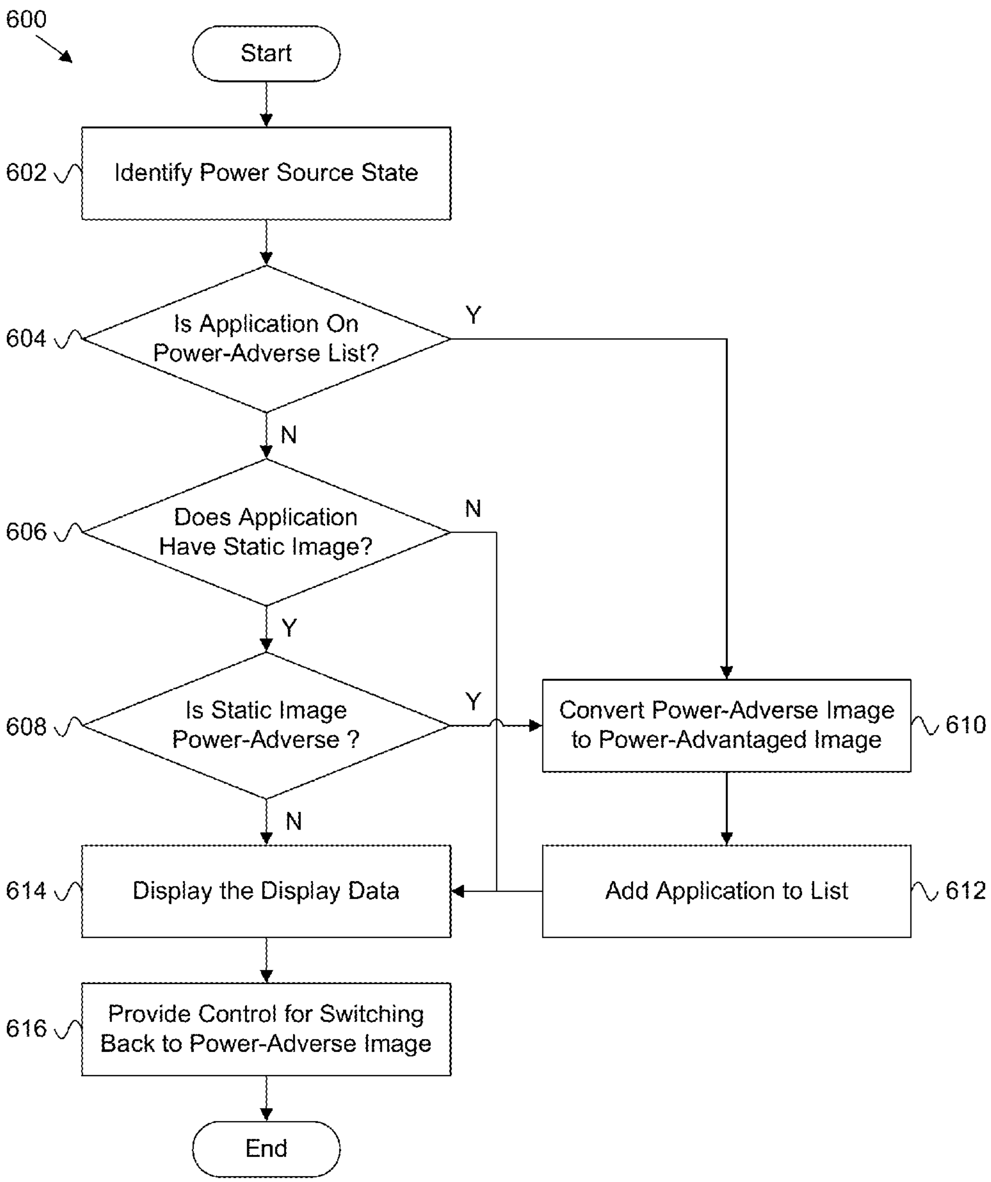
FIG. 6 is a schematic flow chart diagram illustrating another embodiment of a method for power-advantaged image data control.

FIG. 6 depicts a method 600 for power-advantaged image data control according to embodiments of the disclosure. The method 600 begins with determining 602 whether an electronic device, such as the electronic device 101, is running on battery power. In some embodiments, this power state is determined 602 by consulting an internal battery (e.g., the internal power source 108), a power management function (e.g., the power management microcontroller 110), an operating system (e.g., the operating system 120), or the like. In some embodiments, the electronic device 101 is determined to not be running on battery power when an AC adapter, external battery, or external electrical generator (e.g., solar panel) is connected to the electronic device. Determining 602 whether the electronic device is running on battery power may be performed by one or more of the processor 102, the image data control module 104, the internal power source 108, the power management microcontroller 110, the operating system 120, and the power state module 202.

The electronic device then identifies active application and determines 604 whether the application is on power-adverse list. The electronic device may maintain a list of applications known to use power-adverse images. For example, it may be known that a web browser or a word processor uses a power-adverse (e.g., light) background. The electronic device references the list to determine whether the active application is on the list.

If it is determined 604 that the application is on the power-adverse list, then the electronic device converts 610 one or more power-adverse images used by the application into power-advantaged images. Otherwise, if the application is not on the power-adverse list, then the electronic device determines 606 whether the application includes static image.

Determining 606 whether the application contains static image includes identifying images within frames of display data and comparing frames to determine whether the images are static. Examples of static images include, but are not limited to, backgrounds, borders, illustrations, graphs, text, icons, and the like. In certain embodiments, moving text not a part of a video is treated as a static image. For example, text in a ticker banner would be tagged while subtitles in a movie would not be tagged. Determining 606 whether the application contains static image may be performed by one or more of the image data control module 104, graphic processing unit 112, timing controller 116, operating system 120, power analysis module 204, and the image extraction module 208.

If it is determined 606 that the application contains a static image, then the electronic device determines 608 whether the static image is power-adverse. Otherwise, if it is determined 606 that the application does not contains a static image, then the electronic device displays 614 the display data.

In some embodiments, determining 608 whether the static image is power-adverse includes calculating an amount of power required to display an image. Image power requirements may be compared to one or more thresholds. In some embodiments, determining 608 the static image is power-adverse includes analyzing the color distribution, brightness, or luminescence-per-area of the image to determine its power requirements. In some embodiments, determining 608 the static image is power-adverse includes identifying an active application and comparing the active application to a power-adverse application list, the power-adverse application list containing applications known to use static, power-adverse images. Determining 608 the static image is power-adverse may be performed by one or more of the image data control module 104, the power management microcontroller 110, the graphic processing unit 112, the timing controller 116, the operating system 120, the power analysis module 204, and the color analysis module 210.

If it is determined 608 that the static image is power-adverse, then the electronic device converts 610 the power-adverse image to a power-advantaged image. Otherwise, if it is determined 608 that the static image is power-adverse, then the electronic device displays 614 the display data.

Converting 610 the power-adverse image to a power-advantaged image includes inverting the power-intensive image, reducing a brightness of the power-intensive image, and increasing a contrast of the power-intensive image. Converting 610 the image may also include swapping colors among dark text and light backgrounds. Converting 610 the power-adverse image may be performed by one or more of the power management microcontroller 110, graphic processing unit 112, timing controller 116, the operating system 120, and the image replacement module 206.

The electronic device next adds 612 the application using a power-adverse image to the list of power-adverse applications if the application not already on list. In some embodiments, the electronic device also stores converted, power-advantaged images corresponding to the application. Adding the application to the list may be performed by one or more of the image data control module 104, operating system 120, and the application list module 214.

The electronic device next displays 614 the display data. Displaying 614 the display data includes controlling a display device, such as an OLED display panel to present text, graphics, video, and the like included in the display data.

The electronic device then provides 618 one or more controls for switching the displayed images back to the power-adverse forms. Providing 618 the controls may include displaying a pop-up window or other visual alert including controls for switching back to the power-adverse images. In some embodiments, providing 618 the controls includes informing the user that the alternative images are being displayed to minimize power consumption. Providing 618 the controls may be performed by one or more of the image data control module 104, graphic processing unit 112, operating system 120, and the user notification module 212. The method 600 ends.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus comprising:

a processor;

an internal power source;

an active matrix electroluminescent display operatively coupled to the processor; and a memory that stored code executable by the processor to:

determine whether the apparatus is being powered by the internal power source;

identify a frame of display data that includes two or more static images and one or more dynamic images, in response to the apparatus being powered by the internal power source, wherein the two or more static images remain constant from one frame to another and the one or more dynamic images vary from one frame to another;

determine whether each static image in the frame of display data is a power-intensive image;

tag each static image that is a power-intensive image, wherein the frame of display data includes at least one static image that is power-intensive image and at least one static image that is not a power-intensive image;

replace each tagged image within the frame of display data with an alternative image, wherein only tagged images are replaced within the frame of display data; and display the frame of display data on the active matrix electroluminescent display, wherein displaying the frame of display data includes simultaneously displaying at least one alternative image, the one or more dynamic image, and the at least one static image that is not a power-intensive image.

2. The apparatus of claim 1, wherein replacing a tagged image comprises the processor converting the tagged image into the alternative image.

3. The apparatus of claim 2, wherein converting the power-intensive image into the alternative image comprises performing a graphical function selected from the group consisting of: inverting the tagged image, reducing a brightness of the tagged image, and increasing a contrast of the tagged image.

4. The apparatus of claim 1, wherein the memory further comprises code executable by the processor to notify a user that the alternative image is displayed in place of the power-intensive image.

5. The apparatus of claim 1, wherein the memory further comprises code executable by the processor to add an active application to a power-intensive application list in response to the active application comprising a power-intensive static image.

6. The apparatus of claim 1, further comprising a graphics processor unit that converts the tagged image into the alternative image.

7. The apparatus of claim 1, wherein the active matrix electroluminescent display includes a timing controller that converts the tagged image into the alternative image.

8. The apparatus of claim 1, further comprising a power management microcontroller that monitors a power source state, wherein the power management microcontroller inverts the tagged image to form the alternative image in response to an AC power adapter being disconnected.

9. The apparatus of claim 1, wherein determining whether each static image is a power-intensive image comprises the processor analyzing static image data derived from the display data and corresponding to the one or more static images and determining whether the display data includes a power-intensive image based on the distribution of the static image data, wherein the distribution of the static image data is a distribution selected from the group consisting of: a color distribution of the static image data and a spectral power distribution of the static image data.

10. The apparatus of claim 1, wherein determining whether each static image is a power-intensive image comprises the processor identifying an active application and comparing the active application to a power-intensive application list.

11. A method comprising:

determining, by use of a processor, whether a device is running on battery a power source state of an internal power source;

identifying a frame of display data that includes at least two static image and at least one dynamic image, in response to the apparatus being powered by the internal power source, wherein the at least two static images remain constant from one frame to another and the at least one dynamic image varies from one frame to another;

determining whether each static image in the frame of display data is a power-intensive image;

tagging each static image that is a power-intensive image, wherein the frame of display data includes at least one static image that is power-intensive image and at least one static image that is not a power-intensive image;

replacing each tagged image within the frame of display data with a power-advantaged image, wherein only tagged images are replaced within the frame of display data; and displaying the frame of display data on an active matrix electroluminescent display, wherein displaying the frame of display data includes simultaneously displaying at least one power-advantaged image, the at least one dynamic image, and the at least one static image that is not a power-intensive image.

12. The method of claim 11, wherein replacing a tagged image with a power-advantaged image comprises converting the tagged image into the power-advantaged image.

13. The method of claim 12, wherein converting the tagged image into the power-advantaged image comprises performing a graphical function selected from the group consisting of: inverting the tagged image, reducing a brightness of the tagged image, and increasing a contrast of the tagged image.

14. The method of claim 11, further comprising:

notifying a user, in response to displaying the power-advantaged image, that the power-advantaged image is displayed in place of the tagged image; and providing the user a control to display the tagged image in place of the power-advantaged image.

15. The method of claim 11, further comprising adding an active application to a power-adverse application list in response to the active application comprising a tagged image.

16. The method of claim 11, wherein determining whether each static image is a power-adverse image comprises:

comparing a distribution of the static image data to a threshold to determine whether the tagged image is a power-adverse image, wherein the distribution of the static image data is a distribution selected from the group consisting of: a color distribution of the static image data and a spectral power distribution of the static image data.

17. The method of claim 11, wherein determining whether each static image is a power-adverse image comprises:

identifying an active application; and comparing the active application to a power-adverse application list.

18. A program product comprising a non-transitory computer readable storage medium that stores code executable by a processor to perform:

identifying whether an AC power adapter is connected to a device; identifying a frame of display data that includes two or more static images and one or more dynamic images, in response to the device not being connected to the AC power adapter, wherein the two or more static images remain constant from one frame to another and the one or more dynamic images vary from one frame to another;

determining whether each static image in the frame of display data is a power-intensive image while ignoring one or more dynamic images in the frame of display data;

tagging each static image that is a power-intensive image, wherein the frame of display data includes at least one static image that is power-intensive image and at least one static image that is not a power-intensive image;

replacing each tagged image with a power-advantaged image in the frame of display data, wherein only tagged images are replaced within the frame of display data: and displaying the frame of display data on an active matrix electroluminescent display, wherein displaying the frame of display data includes simultaneously displaying at least one power-advantaged image, the at least one dynamic image, and the at least one static image that is not a power-intensive image.

19. The program product of claim 18, wherein replacing a tagged image with a power-advantaged image comprises converting the tagged image into the power-advantaged image by performing a graphical function selected from the group consisting of: inverting the tagged image, reducing a brightness of the tagged image, and increasing a contrast of the tagged image.

20. The program product of claim 18, the code further comprising:

notifying a user, in response to displaying the power-advantaged image, that the power-advantaged image is displayed in place of the tagged image; and providing the user a control to display the tagged image in place of the power-advantaged image.

* * * * *